United States Patent
Timopheev et al.

(10) Patent No.: US 12,442,871 B2
(45) Date of Patent: Oct. 14, 2025

(54) MAGNETORESISTIVE ELEMENT HAVING COMPENSATED TEMPERATURE COEFFICIENT OF TMR

(71) Applicant: Allegro MicroSystems, LLC, Manchester, NH (US)

(72) Inventors: Andrey Timopheev, Vif (FR); Clarisse Ducruet, Chambéry (FR); Jeffrey Childress, San Jose, CA (US)

(73) Assignee: Allegro MicroSystems, LLC, Manchester, NH (US)

( * ) Notice: Subject to any disclaimer, the term of this patent is extended or adjusted under 35 U.S.C. 154(b) by 144 days.

(21) Appl. No.: 18/294,283

(22) PCT Filed: Jul. 8, 2022

(86) PCT No.: PCT/IB2022/056992
§ 371 (c)(1),
(2) Date: Feb. 1, 2024

(87) PCT Pub. No.: WO2023/012612
PCT Pub. Date: Feb. 9, 2023

(65) Prior Publication Data
US 2024/0345182 A1     Oct. 17, 2024

(30) Foreign Application Priority Data
Aug. 5, 2021 (EP) .................... 21315136

(51) Int. Cl.
*G01R 33/00* (2006.01)
*G01R 33/09* (2006.01)
*H01F 10/32* (2006.01)

(52) U.S. Cl.
CPC ....... *G01R 33/0082* (2013.01); *G01R 33/098* (2013.01); *H01F 10/3254* (2013.01)

(58) Field of Classification Search
CPC .............. G01R 33/0082; G01R 33/098; H01F 10/3254; H01F 10/3295; B82Y 25/00; G11B 5/3909
See application file for complete search history.

(56) References Cited

U.S. PATENT DOCUMENTS 3,858,189 A    12/1974   Beausoleil et al.
3,860,965 A    1/1975    Voegeli
(Continued)

FOREIGN PATENT DOCUMENTS

DE    42 12 737 C1    7/1993
DE    196 50 078 A1   6/1998
(Continued)

OTHER PUBLICATIONS

Analog Devices, "High-Speed Digital Isolators, AduM1100AR/AduM1100BR;" ADuM1100AR/ADuM1100BR* Datasheet; Jan. 2001; 12 Pages.
(Continued)

*Primary Examiner* — Alvaro E Fortich
(74) *Attorney, Agent, or Firm* — DALY, CROWLEY, MOFFORD & DURKEE, LLP

(57) ABSTRACT

A magnetoresistive element comprising a reference layer, a ferromagnetic sense layer having a free sense magnetization, and a tunnel barrier layer between the reference layer and the sense layer. The sense layer comprises a first sense layer portion in contact with the tunnel barrier layer and a second sense layer portion in contact with the first sense layer portion. The first sense layer portion is configured such that a magnetic coupling between the first and second sense layer portions is between $\pm 10^{-4}$ $J/m^2$ and $\pm 10^{-3}$ $J/m^2$; and a perpendicular magnetic anisotropy (PMA) originating from the interface between the first sense layer portion and the tunnel barrier layer is between $8 \times 10^4$ A/m and $8 \times 10^5$ A/m, such as to shift positively the TCS of the magnetoresistive (Continued)

element and compensate the negative temperature coefficient of TMR of the magnetoresistive element.

15 Claims, 2 Drawing Sheets

(56) References Cited

U.S. PATENT DOCUMENTS

| | | |
|---|---|---|
| 4,035,785 A | 7/1977 | Kryder |
| 4,078,230 A | 3/1978 | George |
| 4,159,537 A | 6/1979 | Schwartz |
| 4,343,026 A | 8/1982 | Griffith et al. |
| 4,432,069 A | 2/1984 | Rose et al. |
| 4,525,668 A | 6/1985 | Lienhard et al. |
| 4,596,950 A | 6/1986 | Lienhard et al. |
| 4,691,259 A | 9/1987 | Imakoshi |
| 4,712,064 A | 12/1987 | Eckardt et al. |
| 4,823,075 A | 4/1989 | Alley |
| 4,847,584 A | 7/1989 | Pant |
| 4,860,432 A | 8/1989 | Kawata |
| 4,937,521 A | 6/1990 | Yoshino et al. |
| 4,939,449 A | 7/1990 | Cattaneo et al. |
| 4,939,459 A | 7/1990 | Akachi et al. |
| 5,041,780 A | 8/1991 | Rippel |
| 5,049,809 A | 9/1991 | Wakatsuki et al. |
| 5,227,721 A | 7/1993 | Kataoka et al. |
| 5,260,653 A | 11/1993 | Smith et al. |
| 5,500,590 A | 3/1996 | Pant |
| 5,561,368 A | 10/1996 | Dovek et al. |
| 5,570,034 A | 10/1996 | Needham et al. |
| 5,583,725 A | 12/1996 | Coffey et al. |
| 5,617,071 A | 4/1997 | Daughton |
| 5,621,377 A | 4/1997 | Dettmann et al. |
| 5,686,838 A | 11/1997 | van den Berg |
| 5,719,494 A | 2/1998 | Dettmann et al. |
| 5,877,705 A | 3/1999 | Sampey |
| 5,945,825 A | 8/1999 | Clemens |
| 5,952,825 A | 9/1999 | Wan |
| 6,021,065 A | 2/2000 | Daughton et al. |
| 6,031,273 A | 2/2000 | Torok et al. |
| 6,057,049 A | 5/2000 | Fuke et al. |
| 6,100,686 A | 8/2000 | Van Delden et al. |
| 6,175,296 B1 | 1/2001 | Tokunaga et al. |
| 6,300,617 B1 | 10/2001 | Daughton et al. |
| 6,315,875 B1 | 11/2001 | Sasaki |
| 6,329,818 B1 | 12/2001 | Tokunaga et al. |
| 6,331,773 B1 | 12/2001 | Engel et al. |
| 6,392,852 B1 | 5/2002 | Sasaki |
| 6,404,191 B2 | 6/2002 | Daughton et al. |
| 6,445,171 B2 | 9/2002 | Sandquist et al. |
| 6,459,255 B1 | 10/2002 | Tamai et al. |
| 6,501,878 B2 | 12/2002 | Lenssen et al. |
| 6,566,856 B2 | 5/2003 | Sandquist et al. |
| 6,591,481 B2 | 7/2003 | Shimazawa et al. |
| 6,657,826 B2 | 12/2003 | Shimazawa et al. |
| 6,664,785 B2 | 12/2003 | Kohlstedt |
| 6,693,826 B1 | 2/2004 | Black et al. |
| 6,759,841 B2 | 7/2004 | Goto et al. |
| 6,781,359 B2 | 8/2004 | Stauth et al. |
| 6,788,568 B2 | 9/2004 | Hidaka |
| 6,967,798 B2 | 11/2005 | Homola et al. |
| 6,970,333 B2 | 11/2005 | Boeve |
| 7,071,074 B2 | 7/2006 | Schmidt et al. |
| 7,248,045 B2 | 7/2007 | Shoji |
| 7,259,545 B2 | 8/2007 | Stauth et al. |
| 7,336,064 B2 | 2/2008 | Ludwig et al. |
| 7,495,624 B2 | 2/2009 | Daalmans |
| 7,518,354 B2 | 4/2009 | Stauth et al. |
| 7,746,056 B2 | 6/2010 | Stauth et al. |
| 7,759,800 B2 | 7/2010 | Rigg et al. |
| 7,777,607 B2 | 8/2010 | Taylor et al. |
| 7,795,862 B2 | 9/2010 | Doogue et al. |
| 7,859,255 B2 | 12/2010 | Doogue et al. |
| 7,969,144 B2 | 6/2011 | Jajtic et al. |
| 8,203,332 B2 | 6/2012 | Guo et al. |
| 8,629,520 B2 | 1/2014 | Doogue et al. |
| 10,036,785 B2 | 7/2018 | David et al. |
| 10,585,152 B2 | 3/2020 | David et al. |
| 11,946,985 B2 | 4/2024 | Timopheev et al. |
| 11,971,463 B2 | 4/2024 | Mohan et al. |
| 2002/0024337 A1 | 2/2002 | Levert et al. |
| 2002/0180433 A1 | 12/2002 | Van Zon et al. |
| 2002/0186011 A1 | 12/2002 | Murata et al. |
| 2003/0020471 A1 | 1/2003 | Kohlstedt |
| 2004/0023064 A1 | 2/2004 | Ehresmann et al. |
| 2004/0137275 A1 | 7/2004 | Jander et al. |
| 2005/0007834 A1 | 1/2005 | Hidaka |
| 2006/0071655 A1 | 4/2006 | Shoji |
| 2006/0077598 A1 | 4/2006 | Taylor et al. |
| 2006/0087318 A1 | 4/2006 | Crolly et al. |
| 2006/0091993 A1 | 5/2006 | Shoji |
| 2006/0114098 A1 | 6/2006 | Shoji |
| 2006/0145690 A1 | 7/2006 | Shoji |
| 2006/0170529 A1 | 8/2006 | Shoji |
| 2006/0291106 A1 | 12/2006 | Shoji |
| 2007/0044370 A1 | 3/2007 | Shoji |
| 2007/0076332 A1 | 4/2007 | Matus et al. |
| 2007/0090825 A1 | 4/2007 | Shoji |
| 2007/0096716 A1 | 5/2007 | Shoji |
| 2007/0134921 A1 | 6/2007 | Tian et al. |
| 2007/0188946 A1 | 8/2007 | Shoji |
| 2007/0247144 A1 | 10/2007 | Tokuhara et al. |
| 2007/0247943 A1 | 10/2007 | Sato et al. |
| 2008/0062582 A1* | 3/2008 | Komagaki .......... H01F 10/3254 360/324.11 |
| 2008/0080102 A1* | 4/2008 | Ibusuki ................ G01R 33/093 977/947 |
| 2008/0100290 A1 | 5/2008 | Shoji |
| 2008/0266938 A1 | 10/2008 | Molla et al. |
| 2008/0309331 A1 | 12/2008 | Qian et al. |
| 2010/0072988 A1 | 3/2010 | Hammerschmidt et al. |
| 2012/0306490 A1 | 12/2012 | Furuichi et al. |
| 2015/0185297 A1* | 7/2015 | Zimmer ............... G01R 33/093 324/252 |
| 2017/0168122 A1* | 6/2017 | Raberg .................. G11B 5/398 |
| 2017/0371006 A1* | 12/2017 | Ide ..................... G01R 33/0082 |
| 2018/0017637 A1 | 1/2018 | Cesaretti |
| 2019/0154735 A1 | 5/2019 | Shimizu et al. |
| 2019/0339337 A1 | 11/2019 | Sharma et al. |

FOREIGN PATENT DOCUMENTS

| | | |
|---|---|---|
| DE | 100 17 374 A1 | 12/2000 |
| DE | 101 59 607 A1 | 9/2002 |
| DE | 101 28 150 C1 | 1/2003 |
| DE | 10 155 423 A1 | 5/2003 |
| DE | 102 02 287 C1 | 8/2003 |
| DE | 102 22 395 A1 | 12/2003 |
| DE | 10 2004 003 369 A1 | 8/2005 |
| DE | 10 2004 009 267 B3 | 9/2005 |
| DE | 10 2004 038 847 B3 | 9/2005 |
| DE | 10 2004 040 079 B3 | 12/2005 |
| DE | 10 2005 037 905 A1 | 3/2006 |
| DE | 10 2004 053 551 A1 | 5/2006 |
| DE | 10 2006 008 257 A1 | 10/2006 |
| DE | 10 2006 021 774 A1 | 1/2007 |
| DE | 10 2005 038 655 B3 | 3/2007 |
| DE | 10 2005 040 539 B4 | 3/2007 |
| DE | 10 2005 052 688 A1 | 5/2007 |
| DE | 10 2006 007 770 A1 | 8/2007 |
| DE | 10 2006 028 698 B3 | 12/2007 |
| EP | 0 539 081 A1 | 4/1993 |
| EP | 0 710 850 A2 | 5/1996 |
| EP | 1 720 027 A1 | 11/2006 |
| EP | 3 457 154 A1 | 3/2019 |
| EP | 3 467 522 A1 | 4/2019 |
| JP | 57-187671 A | 11/1982 |
| JP | 2000-174358 | 6/2000 |
| JP | 2001-345498 A | 12/2001 |
| JP | 2002-353418 | 12/2002 |
| JP | 2003-179283 A | 6/2003 |
| JP | 2003-525528 | 8/2003 |
| JP | 2004-117367 A | 4/2004 |
| JP | 2006-126087 | 5/2006 |

(56) References Cited

FOREIGN PATENT DOCUMENTS

| JP | 42-12737 B2 | 1/2009 |
|---|---|---|
| WO | WO 2004/109725 A1 | 12/2004 |
| WO | WO 2005/064357 A2 | 7/2005 |
| WO | WO 2006/040719 A1 | 4/2006 |
| WO | WO 2006/136577 A1 | 12/2006 |
| WO | WO 2007/147760 A2 | 12/2007 |
| WO | WO 2013/180277 A1 | 12/2013 |

OTHER PUBLICATIONS

NVE Corporation, "Utilization of GMR Materials. Analog Bridge Output Devices;" Retrieved from: www.nve.com/technical/explinations//Bridge.html; Jan. 2000; 3 Pages.

Daughton et al., "Magnetic Field Sensors Using GMR Multilayer," Proceedings of IEEE Transactions on Magnetics, vol. 30, No. 6, Nov. 1994; pp. 4608-4610, XP000674135. isn: 0018-9464; Figure 4; 3 Pages.

Prinz, "Magnetoelectronics Applications," Journal of Magnetism and Magnetic Materials, vol. 200, Oct. 1999; pp. 57-68, ISSN: 0304-8853, p. 59; Figure 3; 12 Pages.

Spong et al., "Giant Magnetoresistive Spin Valve Bridge Sensor," IEEE Transactions on Magnetics, vol. 32, No. 2; Mar. 1996; pp. 366-371; XP011030196; 6 Pages.

European Intention to Grant dated Apr. 25, 2025 for European Application No. 21315136.8; 25 Pages.

PCT International Search Report and Written Opinion dated Oct. 31, 2022 for International Application No. PCT/IB2022/056992; 10 Pages.

\* cited by examiner

US 12,442,871 B2

MAGNETORESISTIVE ELEMENT HAVING COMPENSATED TEMPERATURE COEFFICIENT OF TMR

CROSS REFERENCE TO RELATED APPLICATIONS

This application is a U.S. National Stage Application of International Patent Application No. PCT/IB2022/056992 filed on Jul. 28, 2022, which is based upon and claims the benefit of priority to European Patent Application No. 21315136.8, filed on Aug. 5, 2021 in the European Patent Office. The disclosures of the above-listed applications are incorporated by reference herein in their entireties.

TECHNICAL DOMAIN

The present disclosure relates to a magnetoresistive element for a magnetic sensor destined to sense an external magnetic field. More particularly, the present disclosure relates to a magnetoresistive element comprising a sense layer having a stable vortex configuration and having a negative temperature coefficient of TMR of the magnetoresistive element that is compensated.

RELATED ART

FIG. 1 shows a cross-section view of a magnetoresistive element 2 comprising a ferromagnetic reference layer 23 having a reference magnetization 230, a ferromagnetic sense layer 21 having a free sense magnetization 210 and a tunnel barrier layer 22 between the sense and reference ferromagnetic layers 21, 23. The sense magnetization 210 can be oriented in an external magnetic field 60 while the reference magnetization 230 remain substantially undisturbed. The external magnetic field 60 can thus be sensed by measuring a resistance of the magnetoresistive sensor element 2. The resistance depends on the relative orientation of the sense magnetization and the reference magnetization.

A low measured resistance ($R_P$) is measured in the magnetoresistive element 2 when the sense magnetization 210 is oriented parallel to the reference magnetization 230. A high resistance ($R_{AP}$) is measured in the magnetoresistive element 2 when the sense magnetization 210 is oriented antiparallel to the reference magnetization 230. The difference between the value of the high and low resistance ($R_{AP}$–$R_P$) is also known as the tunnel magnetoresistance (TMR).

The sense magnetization 210 can comprise a a stable vortex configuration providing a linear and non-hysteretic behavior in a large magnitude range of an external magnetic field. Such magnetoresistive element is thus advantageous for 1D magnetic sensor applications and can be easily configured to adjust its sensitivity.

FIG. 2 shows a hysteresis response (or magnetization curve) to the external magnetic field 60 (Hext, in arbitrary unit) on the sense magnetization 210 (M, in arbitrary unit). The full hysteresis loop of a vortex sense magnetization 210 is characterized by a linear increase of magnetization M with the applied magnetic field Hext until the vortex expulsion field is reached at the $H_{expl}$ point. At this point the sense magnetization 210 becomes magnetically saturated. To recover the vortex state in the sensing layer 21, one needs to reduce the magnetic field below the nucleation field $H_{nucl}$. As long as the applied magnetic field is within the magnitudes corresponding to the expulsion field (+/–$H_{expl}$) of the vortex in the sense magnetization 210, the hysteresis response to the external magnetic field 60 ($H_{ext}$) comprises a reversible linear portion corresponding to the movement of a core of the vortex with the external magnetic field $H_{ext}$. The values and the slope of the linear part of hysteresis loop are strongly dependent on the size of the sense layer 21. The linear and non-hysteretic portion of the magnetization curve facilitates the measurement of small variations of the external magnetic field $H_{ext}$.

The vortex is characterized by its susceptibility χ, which corresponds to the slope of the linear region of the M (H) loop:

$$\chi = \partial M / \partial H_{ext}. \quad (1)$$

The sensitivity S of the magnetoresistive element 2 then will be proportional to the product between the susceptibility χ and the tunnel magnetoresistance (TMR) of the magnetoresistive sensor element 2:

$$S = \chi * TMR. \quad (2)$$

A drawback of such magnetoresistive element is the temperature dependence of the TMR and the magnetic susceptibility χ of the sense layer 21 on the temperature T. When the temperature T increases, the sense magnetization 210 decreases which leads to an increase of the susceptibility χ. On the other hand, the TMR diminishes when the temperature T is increased. This dependence results in a limited accuracy of the magnetoresistive element response over working temperatures and limits potential applications of the magnetoresistive element. Typically, the temperature coefficient of TMR of a conventional magnetoresistive element is large and negative leading to overall negative temperature coefficient of sensitivity (TCS) in the magnetoresistive element.

The TCS can be controlled by using an electronic circuit which compensates change of the sensitivity S of the magnetoresistive sensor element 2 by changing the magnetoresistive element bias voltage with respect to the temperature change. This solution however requires trimming to adjust the TCS. Moreover, using an additional electronic circuit requires larger die size, making the process and development of the magnetoresistive sensor element 2 more complicated.

In European patent application EP20200315015 by the present applicant, a magnetoresistive element comprises a sense layer having a portion comprising a transition metal element in a proportion such that a temperature dependence of a magnetic susceptibility of the sense layer substantially compensates a temperature dependence of the TMR of the magnetoresistive element.

SUMMARY

The present disclosure concerns a magnetoresistive element comprising a reference layer having a pinned reference magnetization, a ferromagnetic sense layer having a free sense magnetization comprising a stable vortex configuration, and a tunnel barrier layer between the reference layer and the sense layer. The sense layer comprises a first sense layer portion in contact with the tunnel barrier layer and a second sense layer portion in contact with the first sense layer portion. The first sense layer portion is configured such that a magnetic coupling between the first and second sense layer portions is between ±10$^{-4}$ J/m$^2$ (Joule Per Square Meter) 10$^{-3}$ J/m$^2$; and a perpendicular magnetic anisotropy (PMA) originating from the interface between the first sense layer portion and the tunnel barrier layer is between 8×10$^4$ A/m (Ampere Per Meter) and 8×10$^5$ A/m, such as to shift positively the TCS of the magnetoresistive element and compensate the negative temperature coefficient of TMR of the magnetoresistive element.

The magnetoresistive element disclosed herein can achieve a high degree of TCS compensation by a relatively modest modification of the of layers in the magnetoresistive element. By contrast, compensation of TCS only by dilution of the sense layer magnetization requires a high concentration of nonmagnetic impurities. This results in nonlinear temperature dependence of magnetic susceptibility which is transferred to nonlinearity of the TSC of the magnetoresistive element.

SHORT DESCRIPTION OF THE DRAWINGS

Exemplar embodiments of the invention are disclosed in the description and illustrated by the drawings in which.

EXAMPLES OF EMBODIMENTS

Figure 1:
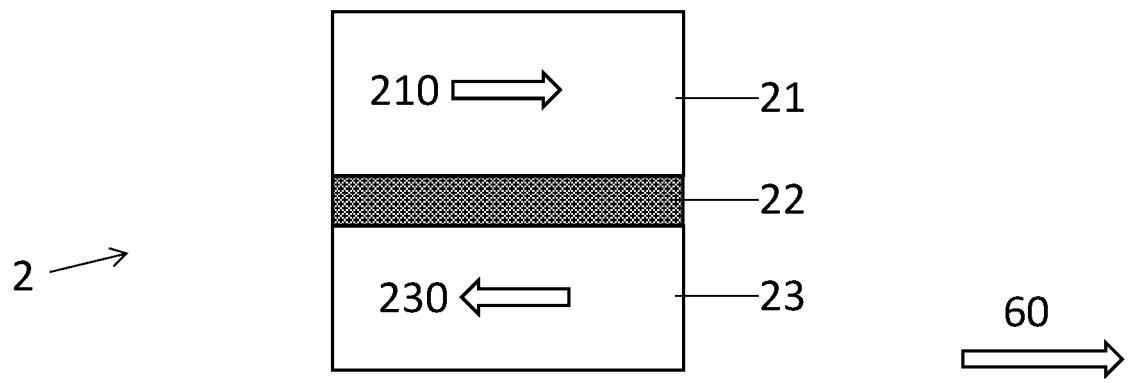
FIG. 1 shows a cross-section view of a magnetoresistive element comprising a sense layer.
Figure 2:
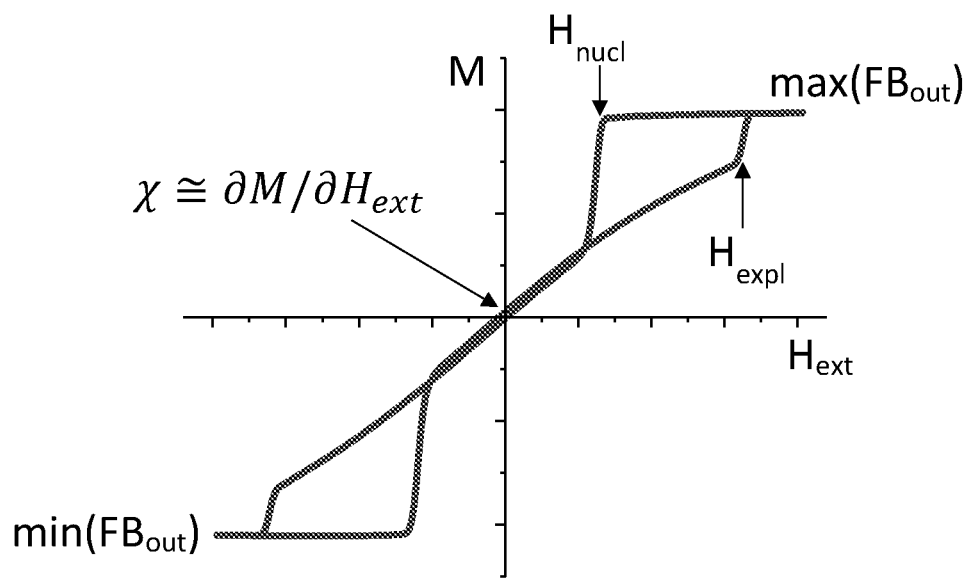
FIG. 2 shows the full hysteresis response to the external magnetic field on the sense magnetization.
Figure 3:
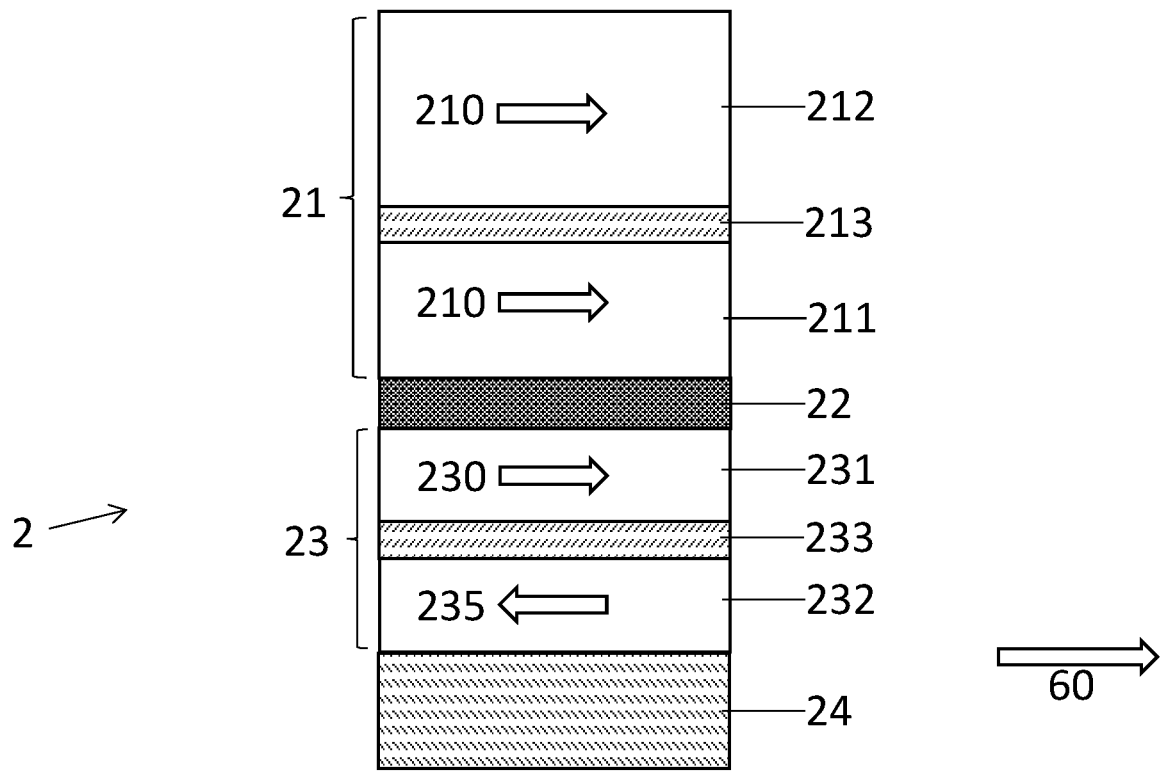
FIG. 3 illustrates a magnetoresistive element comprising a first sense layer portion a second sense layer portion, according to an embodiment.

FIG. 3 illustrates a magnetoresistive element 2 according to an embodiment. The magnetoresistive element 2 comprises a ferromagnetic reference layer 23 having a pinned reference magnetization 230, a ferromagnetic sense layer 21 having a sense magnetization 210, and a tunnel barrier layer 22 between the sense and reference ferromagnetic layers 21, 23. The sense magnetization 210 is configured to be orientable in an external magnetic field 60 while the reference magnetization 230 remains substantially undisturbed. The external magnetic field 60 can thus be sensed by measuring a resistance of the magnetoresistive element 2. The resistance depends on the orientation of the sense magnetization 210 relative to the reference magnetization 230.

The ferromagnetic layers can be made of an iron Fe based alloy, such as CoFe (Cobalt and Iron), NiFe (Nickel and Iron) or CoFeB (Cobalt, Iron and Boron). The reference layer 23 can be pinned by an antiferromagnetic layer 24 by magnetic exchange bias coupling. The antiferromagnetic layer 24 can comprise an alloy based on manganese Mn, such as alloys based on iridium Ir and manganese Mn (e.g., IrMn); alloys based on Fe and Mn (e.g., FeMn); alloys based on platinum Pt and Mn (e.g., PtMn); and alloys based on Ni and Mn (e.g., NiMn). The reference layer 23 can comprise one or a plurality of ferromagnetic layers. In the example illustrated in FIG. 3, the reference layer 23 comprises a synthetic antiferromagnet (SAF) structure comprising at least a first ferromagnetic layer 231 and a second ferromagnetic layer 232 that are separated and coupled antiferromagnetically through an intervening non-magnetic layer 233. The non-magnetic layer is typically a ruthenium Ru layer but can also comprise any of: Ru, Ir or copper Cu or a combination of these elements. In a SAF structure, a first reference magnetization 230 of the first ferromagnetic layer 231 is coupled antiparallel to a second reference magnetization 235 by the nonmagnetic layer 233. In the case the magnetoresistive element 2 comprise an antiferromagnetic layer 24, the second reference magnetization 235 of the ferromagnetic layer 232 adjacent to the antiferromagnetic layer 24 is pinned by the antiferromagnetic layer 24. The thickness of the reference layer 23 will depend on the material selected. In one example, the reference layer 23 may have a thickness from 0.3 nm (Nanometer) to 3 nm.

The tunnel barrier 22 can comprise an insulating material. Suitable insulating materials include oxides, such as aluminum oxide (e.g., $Al_2O_3$) and magnesium oxide (e.g., MgO). A thickness of the tunnel barrier layer 22 can be in the nm range, such as from about 1 nm to about 3 nm.

According to some embodiments, the sense layer 21 comprises a first sense layer portion 211 in contact with the tunnel barrier layer 22 and a second sense layer portion 212 in contact with the first sense layer portion 211.

The second sense layer portion 212 can be configured to allow for a vortex state. For instance, the sense magnetization 210 can comprise a stable vortex configuration. The second sense layer portion 212 can comprise a soft ferromagnetic alloy. For example, the second sense layer portion 212 can comprise an Ni alloy or NiFe alloy possibly comprising a few wt % of Cr, Si, B or V. In one aspect, the second sense layer portion 212 has a thickness that is greater than 15 nm. The second sense layer portion 212 can be up to 120 nm in thickness.

In an embodiment, the first sense layer portion 211 is configured such that a magnetic coupling between the first and second sense layer portions 211, 212 is between 10$^{-4}$ J/m$^2$ and 10$^{-3}$ J/m$^2$, where the sign of the exchange bias coupling can be positive or negative. The first sense layer portion 211 can be further configured such that a PMA field originating from the interface between the first sense layer portion 211 and the tunnel barrier layer 22 is between 8×10$^4$ A/m and 8×10$^5$ A/m.

Adjusting the exchange bias coupling between the first and second sense layer portions 211, 212 to the desired exchange bias coupling values between ±10$^{-4}$ J/m$^2$ and ±10$^{-3}$ J/m$^2$ and adjusting the PMA field to the desired PMA field values between 8×10$^4$ A/m and 8×10$^5$ A/m modifies the magnetic susceptibility of the first sense layer portion 211 and makes its temperature coefficient more positive. The positive temperature coefficient of the first sense layer portion 211 shifts positively the TCS of the magnetoresistive element 2. The positive shift of the magnetoresistive element 2 TCS can be such as to compensate the negative temperature coefficient of TMR of the magnetoresistive element 2. For instance, the TCS of the magnetoresistive element 2 can be shifted more positively by about 200 to 700 ppm/° C., depending on the diameter of the magnetoresistive element 2 and on material type of the second sense layer portion 212.

The first sense layer portion 211 is configured such that a magnetic coupling between the first and second sense layer portions 211, 212 is between 10$^{-4}$ J/m$^2$ and 2×10$^{-3}$ J/m$^2$, or 2×10$^{-4}$ J/m$^2$ and 10$^{-3}$ J/m$^2$, or 2×10$^{-4}$ J/m$^2$ and 2×10$^{-3}$ J/m$^2$. The magnetic coupling between the first and second sense layer portions 211, 212 is typically four to five time less than the one in a sense layer of a conventional magnetoresistive element 2.

In an embodiment, the magnetoresistive element 2 further comprises a mediation layer 213 between the first and second sense layer portions 211, 212. The mediation layer 213 is configured to reduce the magnetic coupling between the first sense layer portion 211 and the second sense layer portion 212. More particularly, the mediation layer 213 can be configured to adjust the exchange bias coupling between the first and second sense layer portions 211, 212 to the desired exchange bias coupling values between $\pm 10^{-4}$ J/m$^2$ and $\pm 10^{-3}$ J/m$^2$, and adjust the PMA field to the desired PMA field values between $8\times 10^4$ A/m and $8\times 10^5$ A/m. The mediation layer 213 can comprise a nonmagnetic layer, preferably a nonmagnetic layer.

In one aspect, the thickness and composition of the mediation layer 213 can be adjusted to arrive at the desired exchange bias coupling values between $\pm 10^{-4}$ J/m$^2$ and $\pm 10^{-3}$ J/m$^2$ and to the desired PMA field values between $8\times 10^4$ A/m and $8\times 10^5$ A/m. In an example, the mediation layer 213 can comprise or can be made of any one or a combination of: niobium Nb, titanium Ti, Ru, tungsten W, tantalum Ta, Ir, molybdenum Mo or Cu. In another example, a thickness of the mediation layer 213 can range between 0.5 nm and 2.5 nm.

It was also shown that the exchange bias coupling between the first and second sense layer portions 211, 212 between $\pm 10^{-4}$ J/m$^2$ and $\pm 10^{-3}$ J/m$^2$ is strong enough to allow the transfer of the vortex state from the second sense layer portion 212 to the first sense layer portion 211. Therefore, the hysteresis response (or magnetization curve) of the magnetoresistive element 2 with the mediation layer 213 can be similar to the one of the magnetoresistive element 2 without the mediation layer 213.

The effective TMR and magnetic susceptibility in the first sense layer portion 211 decreases with a decrease in the magnitude of the PMA field. Since the PMA field decreases quickly with the temperature, it provides a compensation effect to the TCS of the first sense layer portion 211. This effect is more important when the first sense layer portion 211 is thin. For example, the first sense layer portion 211 can be at least about four times thinner than the second sense layer 212.

In one aspect, In another embodiment, the first sense layer portion 211 comprises a Co$_x$Fe$_y$B$_z$ alloy with x and y varying independently from 0 to 100% vol (volume) and z varying from 0 to 20% vol. The thickness the first sense layer portion 211 can be further adjusted to arrive at the desired exchange bias coupling values between $\pm 10^{-4}$ J/m$^2$ and $\pm 10^{-3}$ J/m$^2$ and to the desired PMA field values between $8\times 10^4$ A/m and $8\times 10^5$ A/m. For example, but without limitation, the first sense layer portion 211 has a thickness which can be from 1.5 nm to 4 nm. It should be noted that both PMA field and exchange bias coupling will be decreased by substantially the same amount when the thickness of the first sense layer portion 211 increases.

Figure 4:
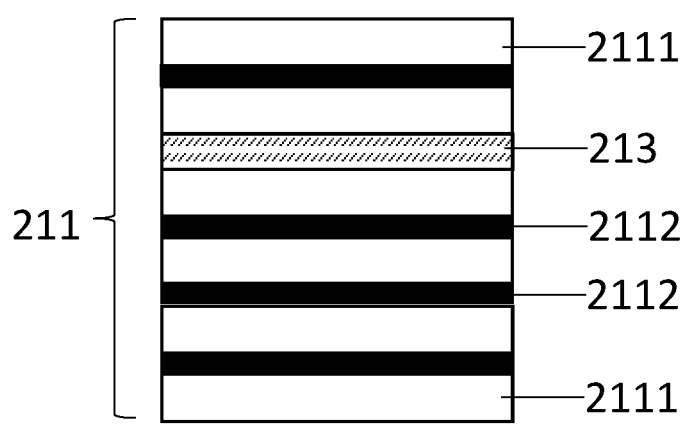
FIG. 4 represent the first sense layer portion comprising a plurality of ferromagnetic sense sublayers, according to an embodiment.

In an embodiment shown in FIG. 4, the first sense layer portion 211 can comprises a plurality of ferromagnetic sense sublayers 2111, each sense sublayer 2111 containing Co$_x$Fe$_y$B$_z$ alloy wherein x, y, z can vary from one sense sublayers 2111 to another. The sense sublayers 2111 can have a thickness between 0.3 nm and 3 nm. The first sense layer portion 211 can further comprise nonmagnetic spacer sublayers 2112 between the sense sublayers 2111. The spacer sublayers 2112 can comprise a metallic nanolayer and have a thickness smaller than 0.4 nm.

In a further embodiment, the second sense layer portion 212 can comprise a dilution element. The dilution element can be alloyed in the second sense layer portion 212 or the second sense layer portion 212 can comprise one or a plurality of dilution nanolayers. The dilution element or dilution nanolayer is configured to dilute the sense magnetization 210 and decreases the Curie temperature Tc of the sense layer 21. Decreasing the Curie temperature Tc of the sense layer 21 results in a faster drop in magnetization with increasing temperature T in the working temperature range of the magnetoresistive element 2. The decrease in magnetization with increasing temperature T results in an increase of the susceptibility $\chi$ with increasing temperature. By adjusting the dilution of the sense magnetization 210 it is then possible to compensate the decrease of the TMR with the increase of the susceptibility $\chi$ with increasing temperature. Adjusting the dilution of the sense magnetization 210 thus allows for further controlling the TCS, for instance shifting positively the TCS of the magnetoresistive element 2 and compensate the negative temperature coefficient of TMR of the magnetoresistive element 2. The dilution element or dilution nanolayer can comprise a transition metal element, for instance Ta, W or Ru.

In an embodiment, the second sense layer portion 212 comprises the dilution element in a proportion less than 15% vol (% by volume).

Compensation of the TCS by dilution of the second sense layer portion 212 can occurs independently from the compensation due to the first sense layer portion 211 and of the compensation due to the mediation layer 213. Compensation of the TCS by dilution of the second sense layer portion 212 can thus be used in addition the compensation due to the first sense layer portion 211 and of the mediation layer 213 to fine tune the TCS of the magnetoresistive element 2.

The inventors have shown that the TCS of the magnetoresistive element 2 disclosed herein can have a TCS about +600 ppm of positive shift when the first sense layer portion 211 is separated from the second sense layer portion 212 by the mediation layer 213. The mediation layer 213 provides the first sense layer portion 211 with a strong (for example between $\pm 10^{-4}$ J/m$^2$ and $\pm 10^{-3}$ J/m$^2$) positive temperature coefficient of magnetic susceptibility. Thus, the positive temperature coefficient of the first sense layer portion 211 in the presence of the mediation layer 213 shifts positively the TCS of the magnetoresistive element 2 and can compensate the negative temperature coefficient originating from the TMR effect. This applies for both positive and negative magnitude of the exchange bias coupling between first and second sense layer portions 211, 212.

The inventors have also shown that the temperature coefficient of TMR in the magnetoresistive element 2 and the temperature dependence of the magnetic susceptibility of the second sense layer portion 212 are not substantially modified between the magnetoresistive element 2 comprising the mediation layer 213 and without the mediation layer 213.

In fact, the magnetoresistive element 2 was characterized by using a physical property measurement system (PPMS). PPMS characterization has shown that there is no difference in temperature dependence of magnetic susceptibility of the second sense layer portion 212 and no significant change in temperature dependence of TMR compared to a conventional sense layer 21. At the same time, one observes noticeable modification of temperature dependence of magnetic susceptibility in the first sense layer portion 211. In fact, the first sense layer portion 211 acquires significantly higher positive temperature coefficient that is responsible for improved TCS of the vortex-based magnetoresistive element.

The PPMS characterization has further shown an increase in the temperature coefficient of the first sense layer portion 211. It is believed that the increase in the temperature coefficient is linked with the PMA field (and the temperature dependence of the PMA field) in the first sense layer portion 211. The interfacial energy of the first sense layer portion 211 is believed to be higher than that of the interfacial energy of an antiferromagnetic coupling through a Ru spacer between the first and second sense layer portions 211, 212.

REFERENCE NUMBERS AND SYMBOLS 2 magnetoresistive sensor element
20 magnetoresistive sensor
21 sense layer
210 sense magnetization
211 first sense layer portion
2111 sense sublayer
2112 spacer sublayer
212 second sense layer portion
213 mediation layer
22 tunnel barrier layer
23 reference layer
230 reference magnetization, first reference magnetization
231 first ferromagnetic layer
232 second ferromagnetic layer
233 non-magnetic layer
235 second reference magnetization
24 antiferromagnetic layer
60 external magnetic field

The invention claimed is:

1. Magnetoresistive element, comprising:
a reference layer having a pinned reference magnetization;
a ferromagnetic sense layer having a free sense magnetization comprising a stable vortex configuration; and
a tunnel barrier layer between the reference layer and the sense layer;
wherein the sense layer comprises a first sense layer portion in contact with the tunnel barrier layer and a second sense layer portion in contact with the first sense layer portion;
wherein the first sense layer portion is configured such that a magnetic coupling between the first and second sense layer portions is between $\pm 10^{-4}$ J/m$^2$ and $\pm 10^{-3}$ J/m$^2$; and a perpendicular magnetic anisotropy (PAM) originating from the interface between the first sense layer portion and the tunnel barrier layer is between $8 \times 10^4$ A/m and $8 \times 10^5$ A/m, such as to shift positively the temperature coefficient of sensitivity (TCS) of the magnetoresistive element and compensate the negative temperature coefficient of TMR of the magnetoresistive element.

2. The magnetoresistive element according to claim 1, comprising a mediation layer between the first and second sense layer portions and magnetically coupling the first sense layer portion with the second sense layer portion.

3. The magnetoresistive element according to claim 1, wherein the mediation layer is made from any one or a combination of: Nb, Ti, Ru, W, Ta, Ir, Mo, Cu.

4. The magnetoresistive element according to claim 1, wherein the mediation layer has a thickness between 2.5 nm and 0.5 nm.

5. The magnetoresistive element according to claim 1, wherein the first sense layer portion has a thickness between 1.5 nm and 4 nm.

6. The magnetoresistive element according to claim 1, wherein the first sense layer portion comprises a Co$_x$Fe$_y$B$_z$ alloy with x and y varying independently from 0 to 100 vol % and z varying from 0 to 20 vol %.

7. The magnetoresistive element according to claim 1, wherein the first sense layer portion comprises a plurality of ferromagnetic sublayers, each ferromagnetic sublayer containing Co$_x$Fe$_y$B$_z$ wherein x, y, z can vary between the sublayers.

8. The magnetoresistive element according to claim 7, further comprising nonmagnetic spacer sublayers between the sense sublayers.

9. The magnetoresistive element according to claim 8, wherein each spacer sublayer is metallic and has a thickness smaller than 0.4 nm.

10. The magnetoresistive element according to claim 1, wherein the second sense layer portion comprises a soft ferromagnetic alloy, such as an NiFe alloy.

11. The magnetoresistive element according to claim 10, wherein the second sense layer portion further comprises a nonmagnetic dilution element with total volume fraction below 15%.

12. The magnetoresistive element according to claim 11, wherein the dilution element comprises one or a plurality of nanolayers in the second sense layer portion.

13. The magnetoresistive element according to claim 1, wherein the second sense layer portion has a thickness greater than 15 nm.

14. The magnetoresistive element according to claim 1, having a diameter smaller than 1 um (micrometer).

15. Sensor device comprising a plurality of magnetoresistive elements according to claim 1, the magnetoresistive elements being electrically connected with each other.

* * * * *